(12) United States Patent
Ido et al.

(10) Patent No.: US 8,020,140 B2
(45) Date of Patent: Sep. 13, 2011

(54) MEDIUM DISTRIBUTION DEVICE, MEDIUM RECEPTION DEVICE, MEDIUM DISTRIBUTION METHOD, AND MEDIUM RECEPTION METHOD

(75) Inventors: Daiji Ido, Shinagawa-ku (JP); Takao Yamaguchi, Kokubunji (JP); Junichi Sato, Machida (JP); Tomoaki Itoh, Kawasaki (JP)

(73) Assignee: Panasonic Corporation, Osaka (JP)

( * ) Notice: Subject to any disclaimer, the term of this patent is extended or adjusted under 35 U.S.C. 154(b) by 1372 days.

(21) Appl. No.: 10/527,054

(22) PCT Filed: Mar. 11, 2004

(86) PCT No.: PCT/JP2004/003184
§ 371 (c)(1),
(2), (4) Date: Mar. 9, 2005

(87) PCT Pub. No.: WO2004/082226
PCT Pub. Date: Sep. 23, 2004

(65) Prior Publication Data
US 2006/0031513 A1 Feb. 9, 2006

(30) Foreign Application Priority Data
Mar. 13, 2003 (JP) .................................. 2003-068356

(51) Int. Cl.
*G06F 9/44* (2006.01)
(52) U.S. Cl. ......................................................... 717/100
(58) Field of Classification Search .................... 717/100
See application file for complete search history.

(56) References Cited

U.S. PATENT DOCUMENTS

| 6,301,604 B1 | 10/2001 | Nojima |
| 6,614,797 B1 * | 9/2003 | Hippelainen ................. 370/410 |
| 7,042,905 B1 * | 5/2006 | Johnson ........................ 370/468 |
| 2002/0049608 A1 | 4/2002 | Hartsell et al. |
| 2003/0162495 A1 * | 8/2003 | Yonemoto et al. ................ 455/7 |
| 2003/0235196 A1 * | 12/2003 | Balachandran et al. ...... 370/392 |

(Continued)

FOREIGN PATENT DOCUMENTS

EP 0923248 A2 6/1999

(Continued)

OTHER PUBLICATIONS

PCT International Search Report dated Jun. 1, 2004.

(Continued)

*Primary Examiner* — Philip Wang
(74) *Attorney, Agent, or Firm* — Seed IP Law Group PLLC

(57) ABSTRACT

According to the media server 100 and the network control apparatus 200, upon distributing a plurality of media data to the media receiving apparatuses 400 having different transmission rates by broadcasting or multicasting, the distribution precedence is attached by associating the program control information and the media data. The distribution precedence attached to the program control information is set same as or lower than the distribution precedence of all media data included in the program concerned. Then, depending on the distribution precedence, the transmission possible media data and the program only are selectively distributed. The program control information relating to the program that includes the receivable media data by the media receiving terminal apparatus 400 only is selected and received. This way, the receivable media data is distributed depending on the transmission environment of the media receiving apparatus. It is possible to prevent the media receiving apparatus selecting the invalid program.

12 Claims, 10 Drawing Sheets

| MEDIA DATA | PROGRAM CONTROL INFORMATION SMIL/SAP | TOS VALUE | TRANSMISSION DISTANCE |
|---|---|---|---|
| TEXT | PROGRAM CONTROL INFORMATION 1 | 1 | L1~L4 |
| STILL IMAGE | PROGRAM CONTROL INFORMATION 2 | 2 | L2~L4 |
| AUDIO | PROGRAM CONTROL INFORMATION 3 | 3 | L3~L4 |
| VIDEO | PROGRAM CONTROL INFORMATION 4 | 4 | L4 |

U.S. PATENT DOCUMENTS

| | | | |
|---|---|---|---|
| 2004/0085959 | A1 | 5/2004 | Ohkawa |
| 2004/0114522 | A1* | 6/2004 | Friesen et al. ................. 370/241 |
| 2005/0020240 | A1* | 1/2005 | Minter ........................ 455/404.1 |
| 2006/0031749 | A1* | 2/2006 | Schramm et al. ........... 715/500.1 |
| 2008/0192769 | A1* | 8/2008 | Tischer et al. ................ 370/466 |

FOREIGN PATENT DOCUMENTS

| | | |
|---|---|---|
| EP | 1235392 A1 | 8/2002 |
| JP | 11161505 | 6/1999 |
| JP | 11161505 A | 6/1999 |
| JP | 2002 247091 | 8/2002 |
| JP | 2002247091 A | 8/2002 |
| JP | 2002 297538 | 10/2002 |
| JP | 2002297538 A | 10/2002 |
| JP | 2003 333050 | 11/2003 |
| JP | 2003333050 A | 11/2003 |

OTHER PUBLICATIONS

Chinese Office Action dated May 30, 2008, with English translation thereof.

Wang Pu, "The Main Design Problems of Distributed Multimedia Systems," Computer Engineering & Science 21(1):19-26, Jan. 21, 1999.

Tdoc S4-030169, "Proposal for Supporting MPEG-4 Scalable Video Codec for MBMS and PSS Discussion," 3GPP TSG-SA WG4 Meeting #25bis, Jan. 24-28, 2003, Berlin, Germany, 5 pages.

International Search Report relating to corresponding International Application No. PCT/JP2004/003184, mailed Jun. 1, 2004, 2 pages Pu, Wang, "The Main Design Problems of Distributed Multimedia Systems," Computer Engineering & Science, vol. 21, No. 1, 1999, pp. 19-26.

Office Action relating to corresponding Chinese Patent Application No. 2004800008262, mailed May 30, 2008, 6 pages Wakuda et al., "Management Methods of Multimedia Traffic in consideration of end-user satisfaction in Mobile Environment," Information Processing Society of Japan, Feb. 5, 1999, pp. 79-84.

Budiarto et al., "MASEMS: A Scalable and extensible Multimedia Server," International Symposium on Database Applications in Non-Traditional Environments (DANTE '99) Proceedings, Kyoto, Japan, 1999, pp. 443-450.

Supplementary European Search Report for corresponding EP Application No. 04719581.3, dated May 11, 2011, 4 pages.

* cited by examiner

```
<smil>
<head>
<layout>
<root-layout width="320" height="480" />
<region id="v" top="5" />
<region id="t" top="10" />
<region id="i" top="20" />
</layout>
</head>
<body>
<par>
<video region="v" src="rtsp://server/sample.mp4/track-ID=1 begin="3s" end="20s" />
<audio src="rtsp://server/sample.mp4/track-ID=2 begin="3s" end="20s" />
<text region="t" src="http://server/test.txt" dur="10s" />
<image region="i" src="http://server/image.jpg" dur="10s" />
</par>
</body>
</smil>
```

PRIOR ART

FIG.2

| MEDIA DATA | PROGRAM CONTROL INFORMATION SMIL/SAP | TOS VALUE | TRANSMISSION DISTANCE |
|---|---|---|---|
| TEXT | PROGRAM CONTROL INFORMATION 1 | 1 | L1~L4 |
| STILL IMAGE | PROGRAM CONTROL INFORMATION 2 | 2 | L2~L4 |
| AUDIO | PROGRAM CONTROL INFORMATION 3 | 3 | L3~L4 |
| VIDEO | PROGRAM CONTROL INFORMATION 4 | 4 | L4 |

FIG.5

```
<smil>
    <head>
        <layout>
            <root-layout width="320" height="480" />
                <region id="t" top="10" />
        </layout>
    </head>
    <body>
    <par>
        <text region="t" src="http://server/test.txt" dur="10s" />
    </par>
    </body>
</smil>
```

FIG.8

```
<smil>
    <head>
        <layout>
            <root-layout width="320" height="480" />
                <region id="t" top="10" />
                <region id="i" top="20" />
        </layout>
    </head>
    <body>
    <par>
        <text region="t" src="http://server/test.txt" dur="10s" />
        <image region="i" src="http://server/image.jpg" dur="10s" />
    </par>
    </body>
</smil>
```

FIG.9

```
<smil>
  <head>
    <layout>
      <root-layout width="320" height="480" />
      <region id="t" top="10" />
      <region id="i" top="20" />
    </layout>
  </head>
  <body>
    <par>
      <audio src="rtsp://server/sample.mp4/track-ID=2 begin="3s" end="20s" />
      <text region="t" src="http://server/test.txt" dur="10s" />
      <image region="i" src="http://server/image.jpg" dur="10s" />
    </par>
  </body>
</smil>
```

FIG.10

```
<smil>
 <head>
  <layout>
   <root-layout width="320" height="480" />
    <region id="v" top="5" />
    <region id="t" top="10" />
    <region id="i" top="20" />
  </layout>
 </head>
 <body>
 <par>
  <video region="v" src="rtsp://server/sample.mp4/track-ID=1 begin="3s" end="20s" />
  <audio src="rtsp://server/sample.mp4/track-ID=2 begin="3s" end="20s" />
  <text region="t" src="http://server/test.txt" dur="10s" />
  <image region="i" src="http://server/image.jpg" dur="10s" />
 </par>
 </body>
</smil>
```

FIG.11

MEDIUM DISTRIBUTION DEVICE, MEDIUM RECEPTION DEVICE, MEDIUM DISTRIBUTION METHOD, AND MEDIUM RECEPTION METHOD

TECHNICAL FIELD

The present invention relates to the media distribution apparatus, the media receiving apparatus, the media distribution method, and the media receiving method, for distributing various kinds of media data.

BACKGROUND ART

A technology called SMIL (Synchronized Multimedia Integration Language) is a method conventionally known for integrating the content that includes text, still image, video, and audio, and for describing the spatial and time arrangements; and it is standardized by 3WC (World Wide Web Consortium).

SMIL is the description language similar to the hypertext description language HTML becoming widespread via the Internet at present; and yet it is a preferred description language for distributing the multimedia data that includes a video.

The method of distributing the content described in SMIL and stored on a server, to a client via a network, is explained by using FIG. 1.

The client 5 uses the communication protocols such as HTTP to access the server 1 storing SMIL files, acquires the SMIL files describing the content, interprets the acquired SMIL files, and acquires the respective media data being described, that is, the text data, the still image data, the video data, the audio data, and the like.

In specific terms, the client 5 acquires the video data and audio data from the server 2; and it acquires the text data and still image data from the server 3.

The client 5 replays the respective media data (video data, audio data, text data, and still image data) at the appropriate position and time, based on the space and time information described in the acquired SMIL files. Alternatively, the SMIL data and each media data can be stored in the same server.

Next, the example of description of an SMIL file is explained by using FIG. 2.

Referring to FIG. 2, the 1st line <smil> indicates an SMIL document, and the 18th line </smil> indicates the end of the SMIL document. In addition, any information not relating to time are described between the 2nd line <head> and the 9th line </head>. In addition, from the 3rd line <layout> to the 8th line </layout> these are the information showing the spatial layout of the content, for defining the size and position of positioning an object. From the 11th line <par > to the 16th line </par> these are the information showing the time of replaying the content. In addition, the media relating to time are described between the 10th line <body> and the 17th line </body>.

From the 5th line to the 7th line, the regions v, t, and i for positioning the video, the text, and the still image are defined respectively. From the 12th line to the 15th line, the time information for replaying the video, the audio, the text, and the still image, are respectively defined.

Each line from the 12th line to the 15th line includes "src=" which specifies URL for acquiring the media data. In this example, the video and audio are acquired by using RTSP protocols, and the text and still image are acquired by using HTTP protocols.

Moreover, "region=" specifies the position for displaying the media data, and corresponds to the regions specified in the 5th line to the 7th line. For example, since the text data specified in the 14th line is the region id="t", it is displayed on the region specified in the 6th line.

The client cannot find out beforehand what kinds of multimedia data are being described in the SMIL files when the content are described in SMIL. In addition to that, it is difficult for the client to decode all kinds of multimedia data assumed.

In addition to that, in the case of using the wireless transmission path for distributing the multimedia data, even if the kinds of multimedia data specified are decodable by the client, because a bandwidth of the wireless transmission path and an error rate change, the multimedia data transmission is made possible at the specified SMIL in some cases while not in others.

In addition to that, the conventional data distribution system is being proposed for distributing the multimedia data. According to this data distribution system, a media receiving terminal apparatus has a decoder acquiring section which acquires a decoder depending on the multimedia data replaying capability. As appropriate, the media receiving terminal apparatus acquires the decoder to replay the multimedia data even if it does not have the multimedia data replay capability specified by the scenario data such as SMIL.

However, the following problems have occurred under the conventional data distribution system when adapted to one-way communication of the media data, such as broadcasting and multicasting.

For the case of distributing the media data via the wireless transmission path, in particular, even if the kinds of multimedia data specified are decodable at the media receiving terminal apparatus, because a bandwidth of the transmission path and an error rate change, the multimedia data transmission is made possible at the specified SMIL in some cases while not in others.

For example, in regard to the third generation cellular phone system, the media data reception of a low bit rate is possible for the user distant from the base station, and that of a high bit rate is possible for the user near the base station.

As this example, the following document is disclosed as the proposal (refer to www.3gpp.org/ftp/TSG_SA/WG4_CODEC/TSGS4_25bis/Docs/S4-030169.zip) by the standardization organization 3GPP of the third generation cellular phone system.

In addition, since the media receiving terminal apparatus such as cellular phone terminal or Personal Digital Assistant already incorporates the decoder implemented using the hardware or the software, therefore, it is no longer possible to acquire and incorporate the required decoder each time.

As for this kind of media receiving terminal apparatus, if a user selects a program including a media data that the user cannot receive, the problem of not being able to receive and replay the media data occurs.

DISCLOSURE OF INVENTION

The aim of the present invention is to offer the media distribution apparatus, the media receiving apparatus, the media distribution method, and the media receiving method, for distributing the receivable media data depending on the transmission environment of the media receiving apparatus, and for preventing the media receiving apparatus selecting the invalid program.

The aim is achieved by distributing the receivable media data depending on the transmission environment of the media receiving apparatus, and by selecting the invalid program of the media receiving apparatus.

BRIEF DESCRIPTION OF DRAWINGS

FIG. 2 is a drawing showing the example of description of the conventional SMIL file;

FIG. 5 is a drawing showing the media distribution setting content stored in the media distribution setting section of the media server according to the present embodiment;

FIG. 8 is a drawing showing the example of description of the SMIL1 file for the text data set by the media server according to the present embodiment;

FIG. 9 is a drawing showing the example of description of the SMIL2 file for the still image data set by the media server according to the present embodiment;

FIG. 10 is a drawing showing the example of description of the SMIL3 file for the audio data set by the media server according to the present embodiment; and FIG. 11 is a drawing showing the example of description of the SMIL4 file for the video data set by the media server according to the present embodiment.

BEST MODE FOR CARRYING OUT THE INVENTION

Embodiment

Hereinafter, the embodiment of the present invention is explained with reference to the drawings.

In the present embodiment, the SDP (Session Description Protocol) data, the SAP (Session Announcement Protocol) data, and the SMIL data are used as the program control information; and the text data, the JPEG (still image) data, the audio data, and the video data are used as the media data.

The SDP and SAP are the technologies specified by IETF (Internet Engineering Task Force); and the SMIL is the technology specified by W3C. The SDP describes a control information such as port number for transmitting the media data classification and the media data included in a program.

SDP as the payload data, the SAP transmits the identifier (msg ID hash) uniquely showing the program, or the control information such as an availability of encryption of the payload and an availability of compression. The SMIL describes the control information relating to the layout information which indicates how to position the media data.

Moreover, these media data and program control information are transmitted by using UDP (User Datagram Protocol), for example.

Moreover, as for the media data, the text data and still image data are the static media. The audio data and video data are the continuous media. Because the transmission bandwidth of the static media is lower than that of the continuous media, therefore, a precedence of distributing the program is higher.

Moreover, among the static data, because the transmission bandwidth of the text data is lower than that of the still image data, therefore, a precedence of distributing the program is higher. Among the continuous media, because the transmission bandwidth of the audio data is lower than that of the video data, therefore, a precedence of distributing the program is higher.

Figure 1:
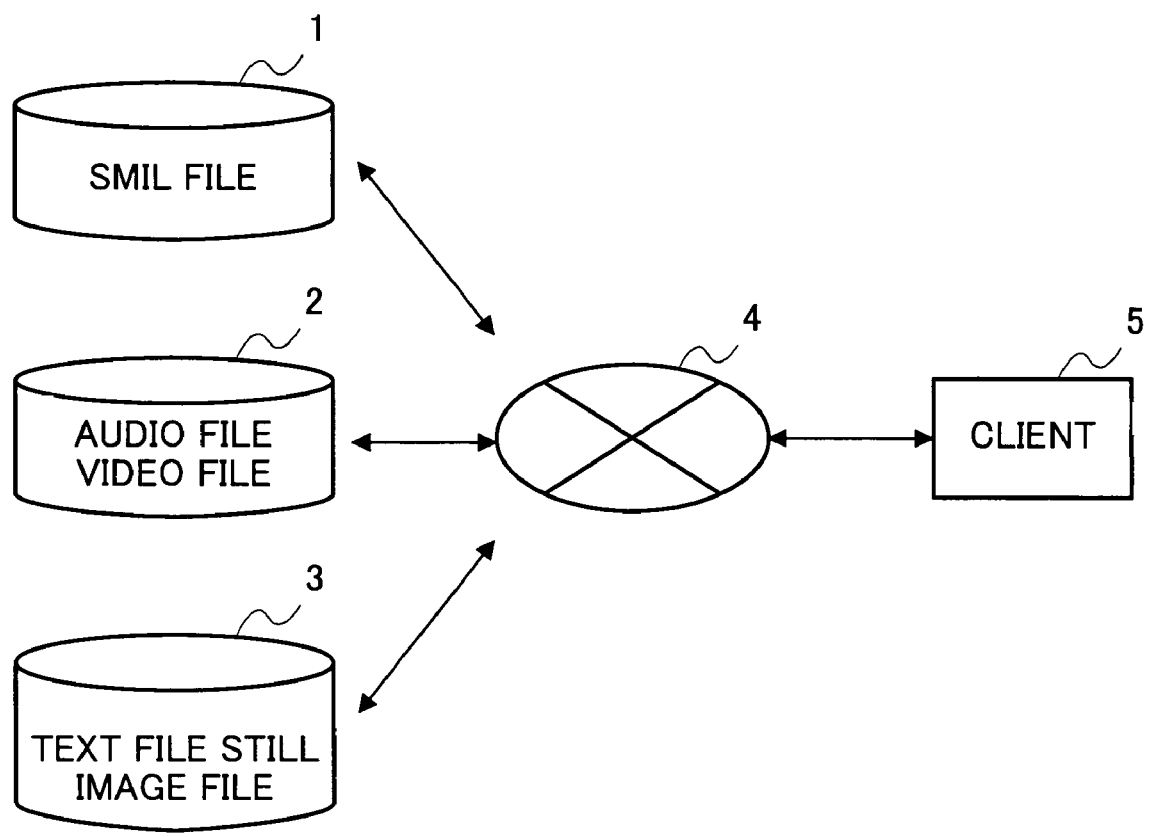
FIG. 1 is a block diagram showing the configuration of the conventional media data distribution system.
Figure 3:
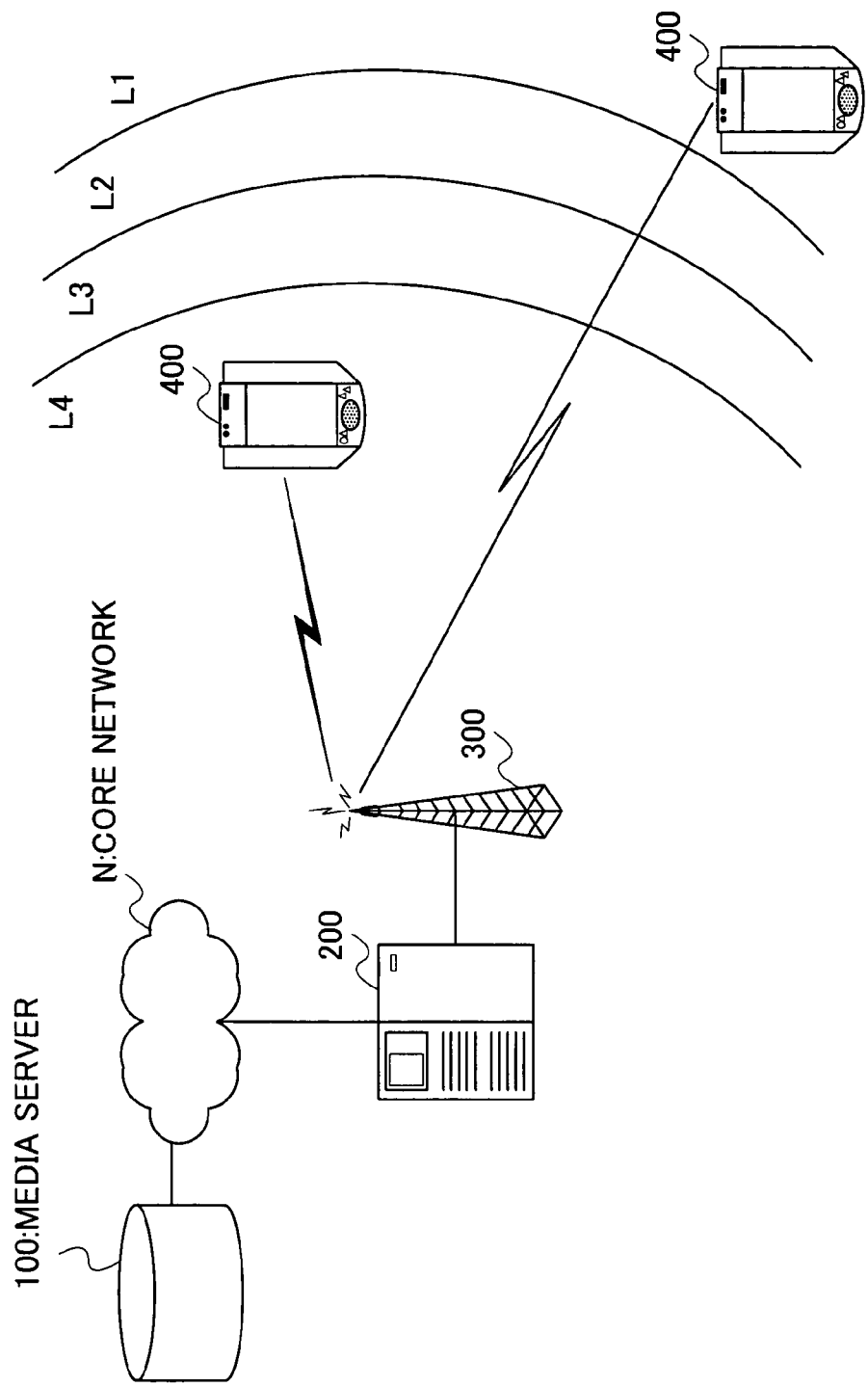
FIG. 3 is a drawing showing the configuration of the whole system including the media server, the network control section, and the media receiving terminal apparatuses according to one embodiment of the present invention.

FIG. 3 is a drawing showing the configuration of the whole system including the media server 100, the network control section 200, and the media receiving terminal apparatuses 400 according to the embodiment of the present invention.

The media server 100 transmits the media data and the program control information to the network control section 200 via the core network N in order to transmit by one-way transmission to a plurality of media receiving terminal apparatuses 400.

The network control section 200 receives the media data and the program control information from the media server 100 via the core network N, and transmits the media data and the program control information to be transmitted to a plurality of media receiving terminal apparatuses 400 to the base station 300.

The base station 300 receives the media data and the program control information from the network control section 200, and transmits the media data and the program control information by wireless communication to a plurality of media receiving terminal apparatuses 400.

A plurality of media receiving terminal apparatuses 400 is a terminal having the functions to replay the audio data and display the media data such as text data, still image data, or video data, based on the media data and the program control information received from the base station 300 by wireless communication.

Moreover, referring to FIG. 3, the receiving areas are set as L1, L2, L3, and L4 depending on the distance from the base station 300 in the descending order of the distance. The maximum transmission bandwidth is secured for the media receiving terminal apparatus 400 in the receiving area L4 nearest to the base station 300. Only the minimum transmission bandwidth is secured for the media receiving terminal apparatus 400 in the receiving area L1 most distant from the base station 300.

Figure 4:
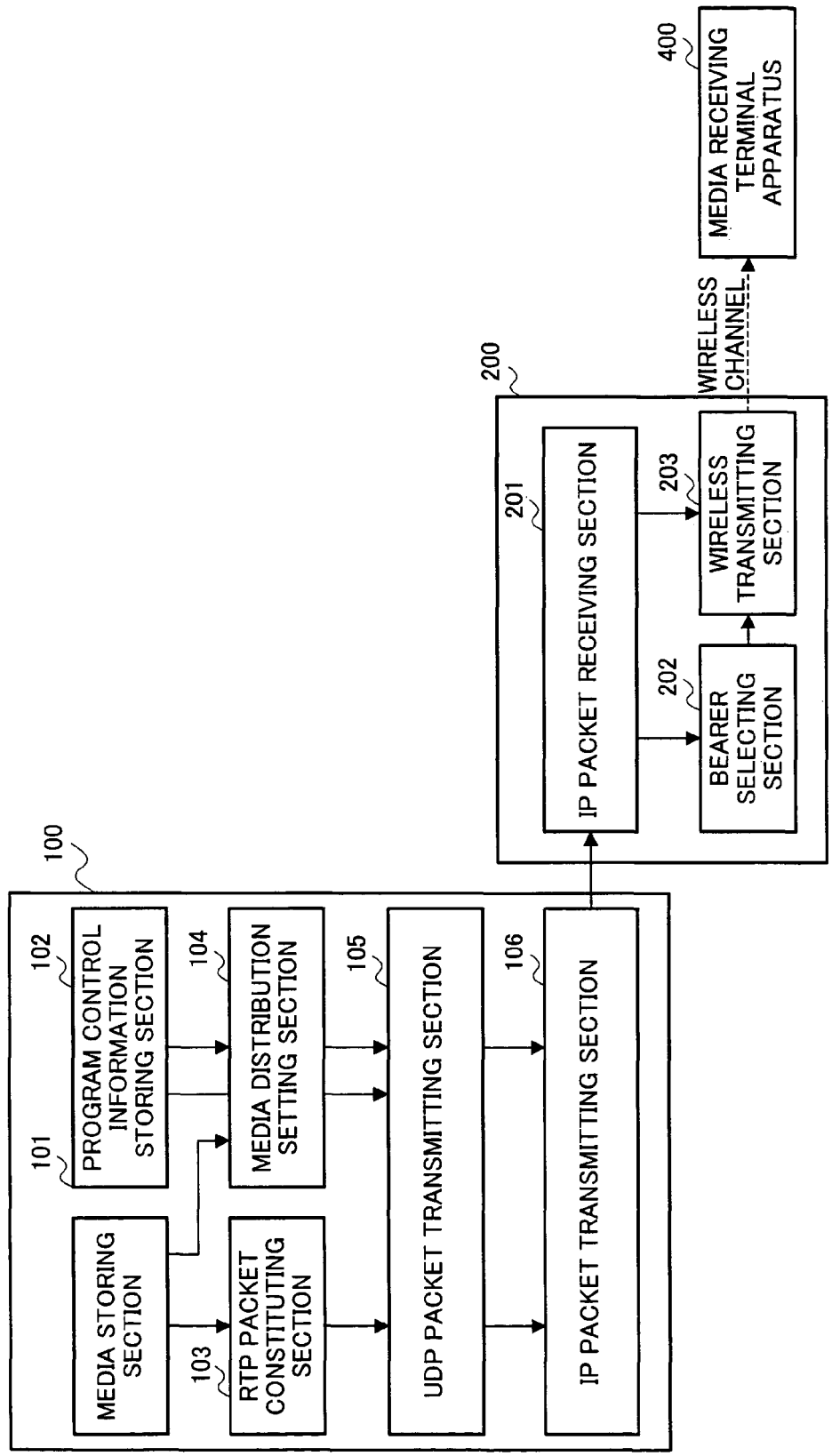
FIG. 4 is a block diagram showing the configuration of each one of the media server and the network control section according to the present embodiment.

FIG. 4 is a block diagram showing the internal configuration of the media server 100 and the network control section 200.

The media server 100 mainly is comprised of the media storing section 101, the program control information storing section 102, the RTP packet constituting section 103, the media distribution setting section 104, the UDP packet transmitting section 105, and the IP packet transmitting section 106.

The media storing section 101 stores the text data, the JPEG (still image) data, the audio data, and the video data as the media data for distributing to a plurality of media receiving terminal apparatuses 400.

The program control information storing section 102 stores the program control information 1 to 4 such as display position, display range, replay time, that are defined in SMIL format for each of the data of the text data, still image data, audio data, and video data included in a program, for displaying the program at the media receiving terminal apparatus 400.

The RTP packet constituting section 103 acquires the media data for distribution from the media storing section 101, constitutes the RTP packets, and outputs them to the UDP packet transmitting section 105.

The media distribution setting section 104, as shown in FIG. 5, associates and sets the program control information 1 to 4 stored in the program control information storing section 102, and the TOS (Type Of Service) values showing the distribution precedence, and the transmission distances corresponding to the receiving areas L1 to L4 from the base station 300 depicted in FIG. 3, for each of media data classifications (such as text, still image, audio, and video).

The UDP packet transmitting section 105 constitutes the UDP packets from the RTP packets constituted at the RTP packet constituting section 103 and the program control information for each media data classification stored in the program control information storing section 102, and transmits them to the IP packet transmitting section 106.

The IP packet transmitting section 106 constitutes the IP packets by attaching the TOS fields which sets the TOS values showing the distribution precedence set at the media distribution setting section 104, attached to the media data including the UDP packets constituted at the UDP packet transmitting section 105, and transmit them to the network control section 200 via the core network N. Note that the TOS field may also be called DSCP (Diffserv Code Point).

The network control section 200 mainly is comprised of the IP packet receiving section 201, the bearer selecting section 202, and the wireless transmitting section 203.

The IP packet receiving section 201 receives the IP packets transmitted from the media server 100 via the core network N, and outputs them to the bearer selecting section 202 and the wireless transmitting section 203.

The bearer selecting section 202 selects the bearer channel suitable for each media data classification, based on the TOS value set at the TOS field attached to the IP packets received from the IP packet receiving section 201, and outputs the bearer channel selection results to the wireless transmitting section 203.

The wireless transmitting section 203 modulates (by wireless) the IP packets input from the IP packet receiving section 201, selects the bearer channels for transmitting (by wireless) the IP packets of the different media data in accordance to the bearer channel selection results input from the bearer selecting section 202, and instructs the base station 300 to make transmission (by wireless) to a plurality of media receiving terminal apparatuses 400 using the bearer channel that selected the modulated IP packet.

Figure 6:
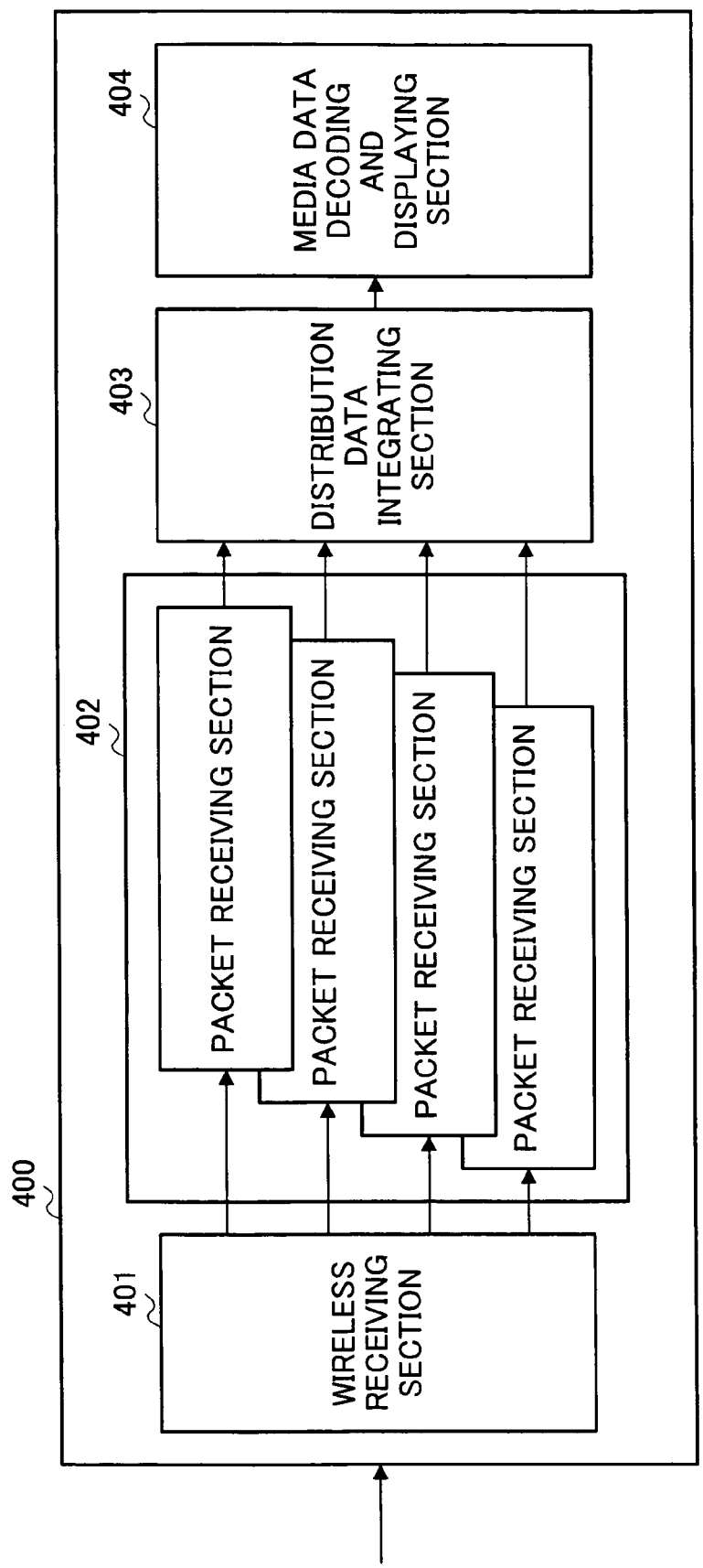
FIG. 6 is a block diagram showing the configuration of the media receiving terminal apparatus according to the present embodiment.

The media receiving terminal apparatus 400 mainly is comprised of the wireless receiving section 401, the packet receiving sections 402, the distribution data integrating section 403, and the media data decoding and displaying section 404, as shown in FIG. 6.

The wireless receiving section 401 receives and demodulates the IP packets transmitted (by wireless) from the base station 300 for each of bearer channels as instructed so by the network control section 200, and outputs each IP packet demodulated to the packet receiving section 402 in parallel.

The packet receiving sections 402 receive the IP packets for each of bearer channels in parallel. For this reason, four packet receiving sections are being arranged in parallel where the IP packets input from the wireless receiving section 401 are received in parallel in accordance to the different bearer channels, and output them to the distribution data integrating section 403.

The distribution data integrating section 403 selects the SMIL file in which the lowest distribution precedence TOS value is set, based on the TOS value set at the TOS field set at each IP packet input from the packet receiving sections 402 in parallel in accordance to the different bearer channels, integrates a plurality of media data into one distribution data, and outputs it to the media data decoding and displaying section 404.

The media data decoding and displaying section 404 controls the replay times and the layouts of the various kinds of media data (such as text, still image, audio, and video), based on the program control information of the various kinds of media data set at the integrated distribution data input from the distribution data integrating section 403, and displays and replays these media data.

Next, the specific example of the bearer channels selected by the network control section 200 is explained with reference to FIG. 7.

In the present embodiment, in order to carry out the wireless transmission for four kinds of media data, the bearer channels 1 to 4 are used for the media data distribution purpose.

The bearer channel 1 is the wireless transmission channel receivable by all media receiving terminal apparatuses 400 in the receiving areas L1 to L4 (refer to FIG. 3) covered by the base station 300, to which the text data having the highest distribution precedence of TOS value 1 is assigned and prioritized as the distribution data.

The bearer channel 2 is the wireless transmission channel receivable by all media receiving terminal apparatuses 400 in the receiving areas between L2 and L4 closer to the base station 300 than the receiving area L1, to which the still image data having a higher distribution precedence of TOS value 2 next to TOS value 1 is assigned as the distribution data.

The bearer channel 3 is the wireless transmission channel receivable by all media receiving terminal apparatuses 400 in the receiving areas between L3 and L4 nearer to the base station 300 than the receiving area L2, to which the audio data having a higher distribution precedence of TOS value 3 next to TOS value 2 is assigned as the distribution data.

The bearer channel 4 is the wireless transmission channel receivable by all media receiving terminal apparatuses 400 in the receiving area L4 most closest to the base station 300, to which the video data having the lowest distribution precedence of TOS value 4 is assigned as the distribution data.

Therefore, the media receiving terminal apparatus 400 where the distance from the base station in the receiving area L4 can receive the program including all media data. The media receiving terminal apparatus 400 in the receiving area L3 can receive the program including three kinds of media data except for a video data. The media receiving terminal apparatus 400 in the receiving area L2 can receive the program including the still image data and text data. The media receiving terminal apparatus 400 in the receiving area L1 can receive the program of text data only.

On the other hand, the media server 100 transmits a plurality of media data and the program control information uniformly to a plurality of media receiving terminal apparatuses 400 irrespective of the size of the transmission bandwidth which is secured by each media receiving terminal apparatus 400 in each of the receiving areas L1 to L4.

Then, the method of realizing the wireless transmission of the media data depending on the transmission bandwidth secured by the media receiving terminal apparatus 400 from the uniformly distributed media data is explained by using FIG. 5.

Figure 7:
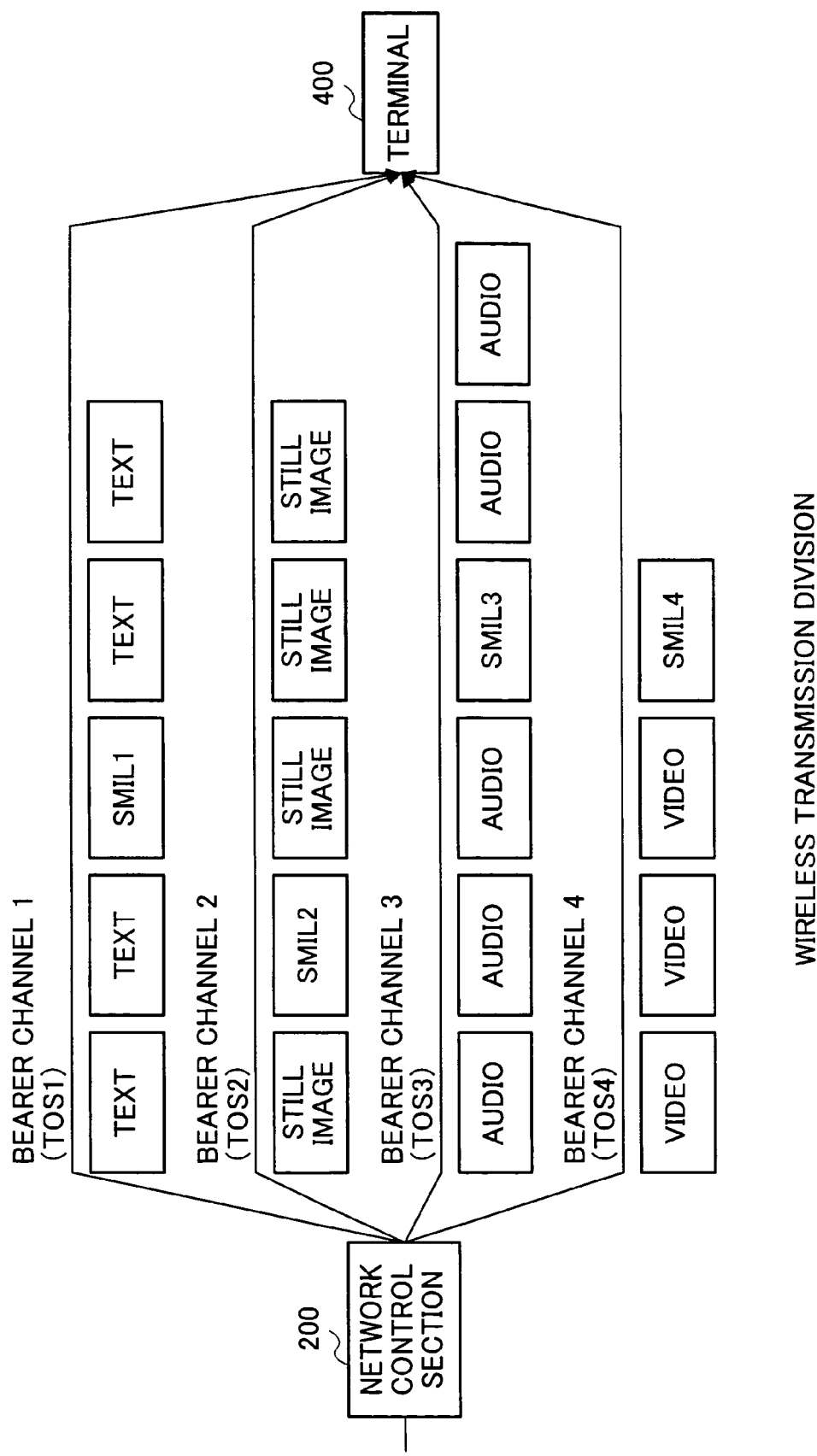
FIG. 7 is a drawing showing the correspondence of the bearer channels selected by the network control section and the various kinds of media data according to the present embodiment.

As already mentioned, in FIG. 7, the logical bearer channels 1 to 4 are extended between the network control section 200 and the media receiving terminal apparatus 400. The network control section 200 makes the selection among the bearer channels 1 to 4 the bearer channels 1 to 4 appropriate for the media data classification included in an IP packet, based on the TOS value set at the TOS field attached to a header of the IP packet, and instructs the base station 300 to transmit it to the media receiving terminal apparatus 400.

The SMIL1 file showing the text data which is the media data having the first the distribution precedence, and its program control information (layout information in this example), are transmitted by using the bearer channel 1.

Similarly, the SMIL2 file showing the JPEG data which is the still image having the second the distribution precedence, and the program control information corresponding to the text and JPEG, are transmitted by using the bearer channel 2.

Similarly, the SMIL3 file showing the audio data having the third distribution precedence, and the program control information corresponding to the audio, text, and JPEG, are transmitted by the bearer channel 3.

Similarly, the SMIL4 file showing the video data having the fourth distribution precedence, and the program control information corresponding to all media, are transmitted by the bearer channel 4.

Next, the method of attaching the TOS fields to the IP packets is explained by using FIG. 5.

In the present embodiment, the media server 100 sets the TOS field at the time of media data transmission.

As shown in FIG. 5, for a text data, along with the program control information (SMIL1 file) 1 showing its layout, the TOS value of 1 is set to the TOS field, being the same value.

For a still image (JPEG) data, along with the program control information (SMIL2 file) 2 showing the layouts corresponding to the text and the still image, the TOS value of 2 is set to the TOS field, being the same value.

For an audio data, along with the program control information (SMIL3 file) 3 showing the layouts and replaying time corresponding to the text, the still image, and the audio, the TOS value of 3 is set to the TOS field, being the same value.

For a video data, along with the program control information (SMIL4 file) 4 showing the layouts and replaying times corresponding to all media data, the TOS value of 4 is set to the TOS field, being the same value.

Next, the examples of description of a plurality of SMIL files are shown in the drawings of FIGS. 8 to 11.

FIG. 8 is a drawing showing the example of description of the SMIL1 file which is the program control information 1 used upon distributing the program which includes the text data as the media data, and adopts the same configuration as the example of description shown in FIG. 2.

FIG. 9 is a drawing showing the example of description of the SMIL2 file which is the program control information 2 used upon distributing the program which includes the text data and the still image data as the media data, and adopts the same configuration as the example of description shown in FIG. 2.

FIG. 10 is a drawing showing the example of description of the SMIL3 file which is the program control information 3 used upon distributing the program which includes the audio data, the text data, and the still image data as the media data, and adopts the same configuration as the example of description shown in FIG. 2.

FIG. 11 is a drawing showing the example of description of the SMIL4 file which is the program control information 4 used upon distributing the program which includes the video data, the audio data, the text data, and the still image data as the media data, and adopts the same configuration as the example of description shown in FIG. 2.

As mentioned above, in the present embodiment, the distribution precedence (the TOS value) attached to the program control information is set lower than or same as the distribution precedence of all media data included in the program concerned.

Moreover, in the present embodiment, particularly, among the media data included in the program, the lowest distribution precedence of the media data is determined as the distribution precedence to be attached to the program control information.

The distribution data integrating section 403 of the media receiving terminal apparatus 400, based on the TOS values set at the TOS fields set at each of IP packets input from the packet receiving section 402 in parallel in accordance to the different bearer channels, selects the SMIL file where the lowest distribution precedence is being set, combines a plurality of media data selected as one distribution data, and outputs it to the media data decoding and displaying section 404.

In the media data decoding and displaying section 404, based on the program control information of the various kinds of media data set to the integrated distribution data input from the distribution data integrating section 403, the layouts and the replay times for the various kinds of media data (such as text, still image, audio, and video) are controlled, and these media data are displayed and replayed.

Thus, according to the media server 100 and the network control section 200 of the present embodiment, upon distributing a plurality of media data to the media receiving terminal apparatus 400 having different transmission rates by broadcasting or multicasting, the distribution precedence is associated and attached to the media data and the program control information. The distribution precedence attached to the program control information is set as same or lower than the distribution precedence of all media data included in the program concerned. This way, only the media data and the program which can be transmitted depending on the distribution precedence are selectively distributed, from the relay apparatus such as the network control section 200 or the base station 300. The media receiving terminal apparatus 400 can select and receive the program control information relating to the program including the receivable media data only.

For this reason, the incident of selecting the program including the media data which cannot be received by the media receiving terminal apparatus 400 is prevented, and the situation where the media data cannot be received and replayed is prevented from occurring.

Therefore, in particular, even for the third generation cellular phone system in which the transmission rates differ depending on the location of the media receiving terminal apparatuses 400, the receivable media data can be distributed depending on the transmission environment of the media receiving terminal apparatus 400 to prevent the media receiving terminal apparatus 400 selecting the invalid program.

Moreover, according to the above-mentioned embodiment, a high distribution precedence is set sequentially in the order of media data having a small transmission bandwidth as the transmission environment; therefore, the data transmission control depending on the distribution precedence can be executed, without having to interpret the media data classification.

Moreover, according to the above-mentioned embodiment, the distribution precedence is set to the program control information depending on the media data classifications included in the program. The program control information is set for each of various kinds of media data. Then, the bearer channel that takes into account the transmission environment is selected for distribution to the media receiving terminal apparatus 400. Therefore, these can prevent the media receiving terminal apparatus 400 from selecting the invalid program.

Moreover, according to the above-mentioned embodiment, a high distribution precedence is set to a program control information relating to a program including a fewer media data classification required by the program; therefore, the program distribution suitable to a plurality of media receiving terminal apparatuses 400 having a different transmission environment is executed.

Moreover, according to the above-mentioned embodiment, a high distribution precedence is set to a program control information relating to a program only including the static media data such as still image and text, set higher than the program control information relating to the program including the continuous media data such as audio and video, in regard to the media data classification which is required by the program. Therefore, the program is distributed that is suitable for a plurality of media receiving apparatuses having a different transmission environment.

Moreover, according to the above-mentioned embodiment, the distribution precedence is set to the program control information and the media data. The distribution precedence to be set to the program control information is set same or lower than the distribution precedence of all media data included in the program concerned. This way, the media data and the relevant program control information can be associated. For example, when the media receiving terminal apparatus 400 is in the environment where a video data is not receivable due to the transmission bandwidth restriction, under such circumstance, it can avoid receiving the program control information including the video data to prevent the media receiving terminal apparatus 400 selecting the invalid program.

Moreover, according to the above-mentioned embodiment, the layout information for positioning a plurality of media data included in the program to the display apparatus of the media receiving terminal apparatus 400 is set in the program control information; therefore, the display form of the program at the media receiving terminal apparatus 400 is controllable.

Moreover, according to the above-mentioned embodiment, a bit rate information and a coding method of the media data included in the program are set in the program control information; therefore, the conditions of replaying the media data in the media receiving terminal apparatus 400 are controllable.

Moreover, according to the above-mentioned embodiment, the port number for distributing a program is included in the program control information. Hence, the distribution is possible by using the suitable port for each of various kinds of media data included in the program.

Moreover, according to above-mentioned embodiment, the distribution precedence is set to the TOS field. The IP packet is constituted by attaching the TOS field for each of various kinds of the media data. The IP packet is distributed by using IP protocol. Therefore, the program distribution service for distributing to the media receiving apparatus is readily implemented by associating the relevant program control information and the media data using IP protocol.

Moreover, according to the above-mentioned embodiment, in the media receiving terminal apparatus 400, based on the distribution precedence set to a plurality of media data and a plurality of control information, the distributed media data are selected, and the distribution data are integrated, replayed and displayed; therefore, the program including the media data depending on the transmission environment can be selected to prevent the selection of the invalid program.

Now, in the present embodiment, although just the core network N is situated in between the media server 100 and the network control section 200, however, the configuration is not limited to this embodiment but the Internet may also be used instead.

Moreover, according to the present embodiment, the third generation cellular phone system is assumed, however, the system is not limited to this embodiment but the system using the wireless LAN, such as IEEE802.11, is also applicable.

Moreover, according to the present embodiment, the network control section 200 performs the transmission control using the precedence. However, the present embodiment is not limited to this form but the base station 300 may be made to perform this control. Alternatively, a gateway section placed somewhere on the transmission path may perform this control.

Moreover, according to the present embodiment, the precedence is set using the TOS field. However, the present embodiment is not limited to this but an IP address that is different according to the precedence may be assigned as the transmission destination IP address.

As explained above, according to the present invention, the receivable media data can be distributed depending on the transmission environment of the media receiving apparatus to prevent the selection of invalid program by the media receiving apparatus.

This specification is based on the Japanese Patent Application No. 2003-68356 filed on Mar. 13, 2003, content of which is expressly incorporated by reference herein.

INDUSTRIAL APPLICABILITY

The present invention is ideally used in the media distribution apparatus, the media receiving apparatus, the media distribution method, and the media receiving method for distributing various kinds of media data.

The invention claimed is:

1. A media distribution apparatus configured to distribute a plurality of media data items using a base station, comprising:
    a memory configured to store a first media data item with a first classification, a second media data item with a second classification that is different from the first classification, first control information associated with the first media data item, and second control information associated with the second media data item;
    a media distribution setting section configured to associate the first media data item and the first control information with a first distribution priority and associate the second media data item and the second control information with a second distribution priority;
    a distributing section configured to distribute the first media data item and the first control information using a first bearer channel associated with the first distribution priority and distribute the second media data item and the second control information using a second bearer channel associated with the second distribution priority, the first bearer channel covering a first receiving area corresponding to a distance from the first receiving area to the base station and the second bearer channel covering a second receiving area corresponding to a distance from the second receiving area to the base station.

2. The media distribution apparatus according to claim 1, wherein the media distribution setting section is configured to assign the first distribution priority and the second distribution priority in ascending order of a media data item using a minimum bandwidth.

3. The media distribution apparatus according to claim 1, wherein the first control information includes first program control information for controlling a first output form of a program that includes the first media data item in a media receiving apparatus, and
the second control information includes second program control information for controlling a second output form of the program that includes the second media data item, the second output form being different from the first output form.

4. The media distribution apparatus according to claim 1, wherein the second receiving area is closer to the base station than the first receiving area.

5. The media distribution apparatus according to claim 3, wherein the media distribution setting section is configured to assign a higher distribution priority to the first control information than the second control information.

6. The media distribution apparatus according to claim 3, wherein the media distribution setting section is configured to assign a higher distribution priority to the first and the second control information associated with static media data items than the first and the second control information associated with continuous media data items, the static media data items including still images and text data, and the continuous media data items including audio and video data.

7. The media distribution apparatus according to claim 3, wherein the media distribution section is configured to set the second distribution priority associated with the second control information equal to or lower than the distribution priority associated with the second media data item.

8. The media distribution apparatus according to claim 3, wherein the first program control information includes layout information for positioning the first media data item on a display apparatus of the media receiving apparatus, and
the second program control information includes layout information for positioning the second media data item on the display apparatus of the media receiving apparatus.

9. The media distribution apparatus according to claim 3, wherein the first program control information includes information about a coding method and bit rate of the first media data item, and the second program control information includes information about a coding method and bit rate of the second media data item.

10. The media distribution apparatus according to claim 3, wherein the first program control information includes a port number for distributing the first media data item, and the second program control information includes a port number for distributing the second media data item.

11. The media distribution apparatus according to claim 3, wherein:
the media distribution setting section is configured to set the first distribution priority and the second distribution priority in a type of service field in an Internet protocol packet; and
the distribution section is configured to form the Internet protocol packet by providing the type of service field for the first media data item and the second media data item read from the memory, and distribute the Internet protocol packet to the media receiving apparatus using an Internet protocol.

12. A method in a distribution apparatus for distributing a plurality of media data items using a base station, the method comprising:
storing in a memory a first media data item with a first classification, a second media data item with a second classification that is different from the first classification, first control information associated with the first media data item, and second control information associated with the second media data item;
associating the first media data item and the first control information with a first distribution priority and associating the second media data item and the second control information with a second distribution priority; and
distributing the first media data item and the first control information using a first bearer channel associated with the first distribution priority and distributing the second media data item and the second control information using a second bearer channel associated with the second distribution priority, the first bearer channel covering a first receiving area corresponding to a distance from the first receiving area to the base station and the second bearer channel covering a second receiving area corresponding to a distance from the second receiving area to the base station.

* * * * *